US012602769B2

(12) United States Patent　　(10) Patent No.:　US 12,602,769 B2

Siddiqui et al.　　(45) Date of Patent:　Apr. 14, 2026

(54) SYSTEMS AND METHODS FOR DETECTING VEHICLE DEFECTS

(71) Applicant: Ford Global Technologies, LLC, Dearborn, MI (US)

(72) Inventors: Adil Nizam Siddiqui, Farmington Hills, MI (US); Mahmoud Yousef Ghannam, Canton, MI (US); Jonathan Engels, Tecumseh, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 475 days.

(21) Appl. No.: 17/410,193

(22) Filed: Aug. 24, 2021

(65) Prior Publication Data

US 2023/0067659 A1　Mar. 2, 2023

(51) Int. Cl.
*G06T 7/00*　　(2017.01)
*G06T 3/40*　　(2024.01)

(52) U.S. Cl.
CPC ................. *G06T 7/001* (2013.01); *G06T 3/40* (2013.01); *G06T 2207/10024* (2013.01); *G06T 2207/30268* (2013.01)

(58) Field of Classification Search
None
See application file for complete search history.

(56) References Cited

U.S. PATENT DOCUMENTS 8,131,059 B2　3/2012　Taguchi et al.
9,189,844 B2 *　11/2015　Wu ..................... G01N 21/9501

| | | | | |
|---|---|---|---|---|
| 10,210,387 | B2 * | 2/2019 | Clifford ..................... | G06T 7/70 |
| 10,414,452 | B2 | 9/2019 | Park et al. | |
| 10,742,892 | B1 * | 8/2020 | Le ......................... | H04N 23/741 |
| 10,762,540 | B1 * | 9/2020 | Price .................. | G06Q 30/0278 |
| 11,715,195 | B2 * | 8/2023 | Stellari .................. | G06T 7/0004 |
| | | | | 382/100 |
| 2004/0052410 | A1 * | 3/2004 | Yasukawa .......... | H04N 1/00079 |
| | | | | 382/141 |
| 2008/0049238 | A1 * | 2/2008 | Nagarajan .............. | G06V 10/28 |
| | | | | 358/1.9 |
| 2010/0232712 | A1 * | 9/2010 | Tomita ................. | G06V 40/161 |
| | | | | 382/209 |
| 2018/0260793 | A1 * | 9/2018 | Li .......................... | G06Q 40/08 |

(Continued)

FOREIGN PATENT DOCUMENTS

JP　　　2013191053　　　9/2013

OTHER PUBLICATIONS

Tsai et al. ("Fast Normalized cross correlation for defect Detection", Pattern Recognition Letters, 2003) (Year: 2003).*

(Continued)

*Primary Examiner* — Randolph I Chu
(74) *Attorney, Agent, or Firm* — Burris Law, PLLC

(57)　　　　　ABSTRACT

A method includes obtaining an image from one or more imaging devices disposed in the interior of the vehicle, modifying the image based on a color conversion routine to generate a source image, generating a conformity value based on a comparison between the source image and a template image corresponding to the interior of the vehicle, where the conformity value is a cross-correlation value, a normalized cross-correlation value, a sum-of-squared difference value, or a combination thereof, and determining a presence of a defect based on the conformity value.

14 Claims, 4 Drawing Sheets

(56) References Cited

U.S. PATENT DOCUMENTS

| | | | |
|---|---|---|---|
| 2018/0330475 A1* | 11/2018 | Tokatyan | G06T 7/001 |
| 2019/0266715 A1* | 8/2019 | Myers | H04N 7/185 |
| 2019/0295030 A1* | 9/2019 | Candeloro, Jr. | G06Q 10/087 |
| 2020/0184676 A1* | 6/2020 | Jiang | G06T 7/001 |
| 2021/0034888 A1* | 2/2021 | Ye | G06V 20/59 |
| 2021/0049384 A1* | 2/2021 | Morrow | G06Q 40/08 |
| 2021/0092331 A1* | 3/2021 | Terauchi | B60R 1/074 |
| 2021/0398271 A1* | 12/2021 | Lee | G06T 7/001 |
| 2022/0004778 A1* | 1/2022 | Ishiko | B60R 1/28 |
| 2022/0033108 A1* | 2/2022 | Radhakrishnan | B64F 5/60 |
| 2022/0063569 A1* | 3/2022 | Herman | B60N 2/90 |
| 2022/0114376 A1* | 4/2022 | Miyata | G06V 20/597 |
| 2022/0198634 A1* | 6/2022 | Wu | G06T 7/001 |
| 2022/0292686 A1* | 9/2022 | Yasui | G06V 40/103 |

OTHER PUBLICATIONS

Wikipedia Channel (digital image) archived on Aug. 2, 2021 (Year: 2021).*

* cited by examiner

SYSTEMS AND METHODS FOR DETECTING VEHICLE DEFECTS

FIELD

The present disclosure relates to systems and methods for detecting vehicle defects.

BACKGROUND

The statements in this section merely provide background information related to the present disclosure and may not constitute prior art.

Operators may perform visual inspections of interior and exterior vehicle components during or after a manufacturing process or operation is completed. However, visual inspections performed by human operators may not detect certain component defects, installation defects, or other types of defects due to vision limitations and environment factors inhibiting the operator to accurately perform the visual inspection. These and other issues with visual inspections of interior and exterior components are addressed by the present disclosure.

SUMMARY

This section provides a general summary of the disclosure and is not a comprehensive disclosure of its full scope or all of its features.

The present disclosure provides a method for inspecting an interior of a vehicle. The method includes obtaining an image from one or more imaging devices disposed in the interior of the vehicle, modifying the image based on a color conversion routine to generate a source image, generating a conformity value based on a comparison between the source image and a template image corresponding to the interior of the vehicle, where the conformity value is a cross-correlation value, a normalized cross-correlation value, a sum-of-squared difference value, or a combination thereof, and determining a presence of a defect based on the conformity value.

In one form, modifying the image based on the color conversion routine to generate the source image further comprises converting the source image to one of a binary-type image and a grayscale-type image. In one form, the method further includes adjusting an image scale of the template image in response to a size of the source image being unequal to a size of the template image. In one form, adjusting the image scale of the template image further comprises iteratively adjusting the image scale of the template image, determining a correlation coefficient value for each iteration, and determining a value of the image scale based on the correlation coefficient value of each iteration. In one form, the method includes obtaining a first image and a second image from the one or more imaging devices and averaging a plurality of pixel values of the first image with a plurality of pixel values of the second image to generate the source image. In one form, determining the presence of the defect further comprises comparing the conformity value to a reference conformity value. In one form, the method further includes determining a defect type based on a segmentation-based image processing routine. In one form, the segmentation-based image processing routine further comprises identifying one or more components of the source image and comparing the one or more components of the source image to one or more predefined reference components of the template image.

The present disclosure provides a system for inspecting an interior of a vehicle. The system includes a processor and a nontransitory computer-readable medium comprising instructions that are executable by the processor. The instructions include obtaining a plurality of images from one or more imaging devices disposed in the interior of the vehicle, averaging a plurality of pixel values of the plurality of images to generate an averaged image, and modifying the averaged image based on a color conversion routine to generate a source image, where the source image is one of a binary-type image and a grayscale-type image. The instructions include generating a conformity value based on a comparison between the source image and a template image corresponding to the interior of the vehicle, where the conformity value is a cross-correlation value, a normalized cross-correlation value, a sum-of-squared difference value, or a combination thereof, and determining a presence of a defect based on the conformity value.

In one form, the instructions further include adjusting an image scale of the template image in response to a size of the source image being unequal to a size of the template image. In one form, the instructions for adjusting the image scale of the template image further comprise iteratively adjusting the image scale of the template image, determining a correlation coefficient value for each iteration, and determining a value of the image scale based on the correlation coefficient value of each iteration. In one form, the instructions for determining the presence of the defect further comprise comparing the conformity value to a reference conformity value. In one form, the instructions further comprise determining a defect type based on a segmentation-based image processing routine. In one form, the instructions corresponding to the segmentation-based image processing routine further comprise identifying one or more components of the source image and comparing the one or more components of the source image to one or more predefined reference components of the template image.

The present disclosure provides a method for inspecting an interior of a vehicle. The method includes obtaining a plurality of images from one or more imaging devices disposed in the interior of the vehicle, averaging a plurality of pixel values of the plurality of images to generate an averaged image, and modifying the averaged image based on a color conversion routine to generate a source image, where the source image is one of a binary-type image and a grayscale-type image. The method includes generating a conformity value based on a comparison between the source image and a template image corresponding to the interior of the vehicle, where the conformity value is a cross-correlation value, a normalized cross-correlation value, a sum-of-squared difference value, or a combination thereof, and determining a presence of a defect based on the conformity value.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
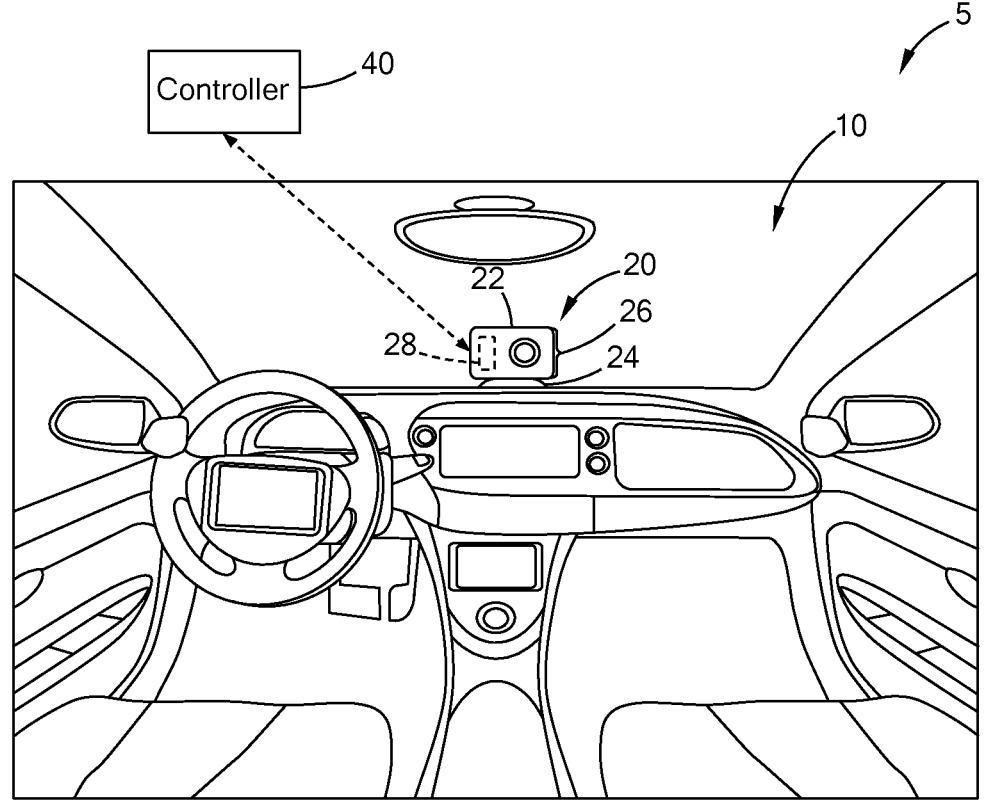
FIG. 1 illustrates an environment for inspecting an interior of a vehicle in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides an inspection routine for inspecting an interior or exterior of the vehicle. A controller is configured to modify images of the vehicle based on a color conversion routine to generate a source image. The controller performs a normalized cross-correlation routine, a cross-correlation routine, or a sum-of-squared difference routine to compare the source image and a template image representing nominal positions, orientations, and characteristics of the vehicle components. The controller is configured to determine the presence and/or types of defects of the vehicle based on the comparison.

The controller may iteratively perform the inspection routine as a vehicle traverses through various steps of a manufacturing routine, such as a routine for building the vehicle. As such, the controller enables an operator to readily identify the presence and/or type of defect of the vehicle at a given step of the manufacturing routine as opposed to a manual identification of the defect once the manufacturing process is completed (i.e., once the vehicle is built).

Figure 2:
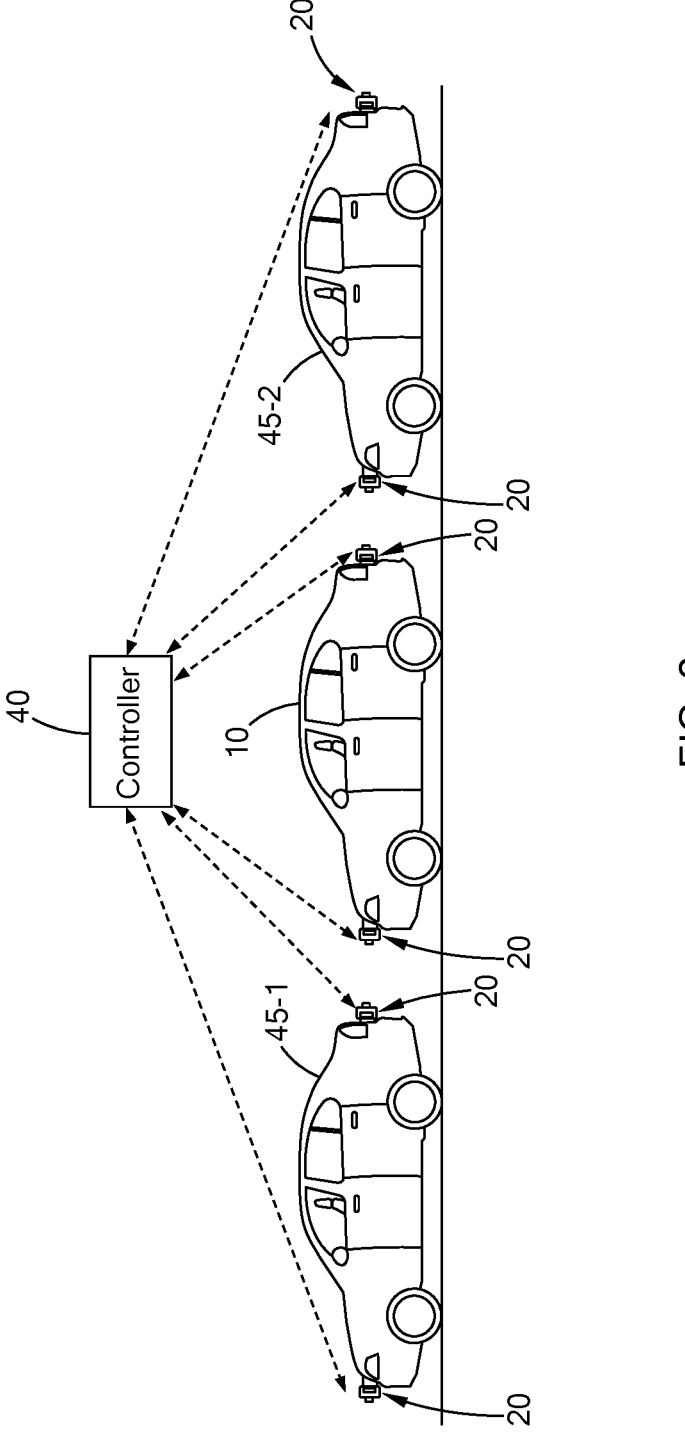
FIG. 2 illustrates an environment for inspecting an exterior of a vehicle in accordance with the teachings of the present disclosure.

Referring to FIGS. 1-2, an environment 5 for detecting defects of a vehicle 10 is provided. The environment 5 generally includes imaging system 20 and a controller 40. While the controller 40 is illustrated as part of the environment 5, it should be understood that the controller 40 may be positioned remotely from the environment 5 in other forms. In one form, the imaging system 20 and the controller 40 are communicably coupled using a wired and/or wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the imaging system 20 includes one or more image sensors 22, attachment elements 24, a power supply 26, and a communication module 28. In one form and as shown in FIG. 1, the image sensors 22 are configured to obtain images of the interior of the vehicle 10. In one form and as shown in FIG. 2, the image sensors 22 are configured to obtain images of the exterior of the vehicle 10, such as adjacent vehicles 45-1, 45-2 within the environment 5. In one form, the image sensors 22 are provided by exterior/interior image sensors of the vehicle 10 and/or separate image sensors that are removable from the vehicle 10 when a manufacturing operation/process is completed. The image sensors 22 may include, but are not limited to: a two-dimensional (2D) camera, a 3D camera, an RGB-camera, a stereo vision camera, an infrared sensor, a radar scanner, a laser scanner, a light detection and ranging (LIDAR) sensor, and/or an ultrasonic sensor. As an example, the image sensors 22 include single monocular RGB cameras or a pair of RGB stereo vision cameras configured to obtain images at different lighting conditions.

In one form, the attachment elements 24 are removable or fixed devices that attach the image sensors 22 to a given surface of the interior and/or exterior of the vehicle 10, such as a camera mount. It should be understood that the attachment elements 24 may be removed from the imaging system 20 when the image sensors 22 are provided by image sensors of the vehicle 10.

In one form, the power supply 26 is configured to provide electrical power to the image sensors 22 and the communication module 28. As an example, the power supply 26 is a battery that is integrated with the image sensors 22 and the communication module 28. As another example, the power supply 26 is a battery that is provided on an autonomous mobile robot (AMR) in which the vehicle 10 is disposed on during a manufacturing process, and the power supply 26 is electrically coupled to the image sensors 22 and the communication module 28 via wires (e.g., twisted pair cables) or a wireless power transfer system (e.g., inductive coupling systems). It should be understood that the power supply 26 may include various other types of electrical power supplies and is not limited to the examples described herein.

In one form, the communication module 28 is configured to broadcast image data to the controller 40. As an example, the image data may include the images obtained by the image sensors 22 and a vehicle type (e.g., make, model, and/or identification number of the vehicle 10). Accordingly, the communication module 28 may include various components for performing the operations described herein, such as, but not limited to: transceivers, routers, and/or input/output interface hardware.

In one form, the controller 40 obtains the image data from the communication module 28 and determines a presence of a defect of an interior of the vehicle 10 and/or an exterior of the adjacent vehicles 45-1, 45-2 based on the image data. In one form, the controller 40 may iteratively obtains the image data from the communication module 28 and as the vehicles 10, 45-1, 45-2 traverse through various steps of a manufacturing routine, such as a routine for building the vehicles 10, 45-1, 45-2. Further details regarding the operation of the controller 40 are provided below with reference to FIG. 3.

Figure 3:
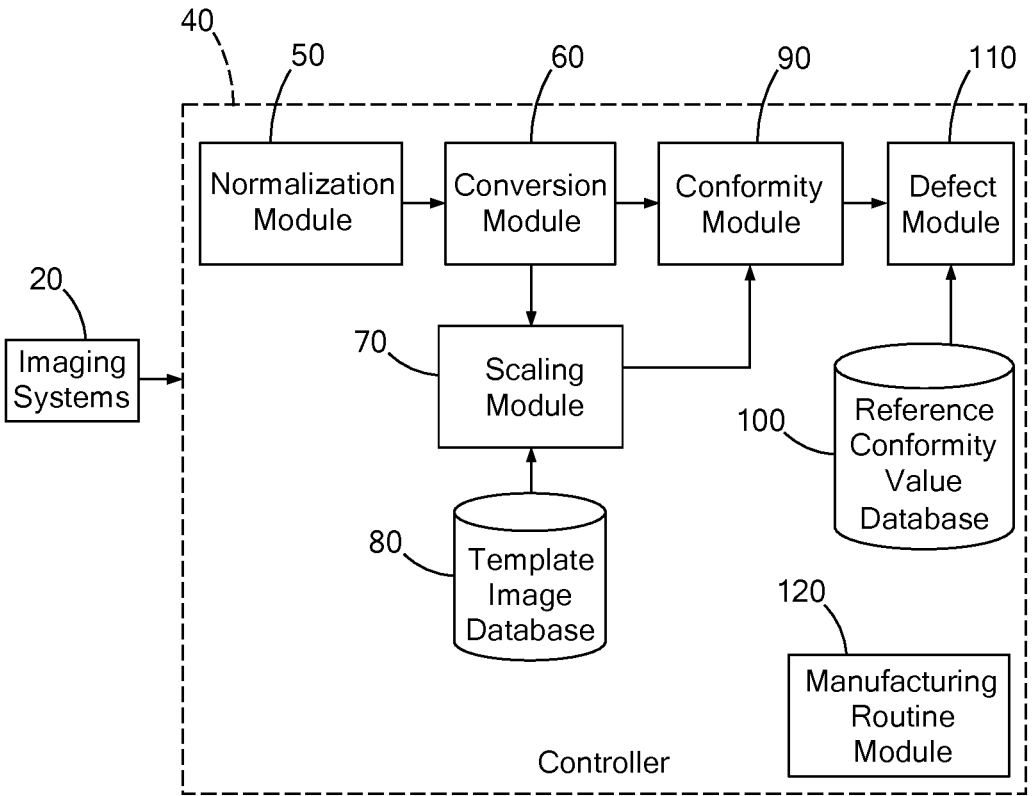
FIG. 3 illustrates a functional block diagram of a controller in accordance with the teachings of the present disclosure.

Referring to FIG. 3, the controller 40 includes a normalization module 50, a conversion module 60, a scaling module 70, a template image database 80, a conformity module 90, a reference conformity value database 100, a defect module 110, and a manufacturing routine module 120. It should be readily understood that any one of the components of the controller 40 can be provided at the same location or distributed at different locations (e.g., via one or more edge computing devices) and communicably coupled accordingly.

In one form, the normalization module 50 obtains the images broadcasted by the communication module 28 and performs a normalization routine to generate a normalized image. As an example, the normalization module 50 averages each pixel value of an image associated with a first lighting condition (e.g., when no flash is generated by the image sensors 22) with each corresponding pixel value of a second image associated with a second lighting condition (e.g., when a flash is generated by the image sensors 22) to generate an averaged image. As such, the normalization module 50 is configured to normalize luminance of the images obtained by the image sensors 22 under different lighting conditions. It should be understood that the normalization module 50 may perform other types of normalization routines on the images to generate the normalized image and is not limited to the example described herein.

In one form, the conversion module 60 modifies the averaged image based on a color conversion routine to generate a source image. In one form, modifying the averaged image includes converting the averaged image to a binary-type image, which may be an image having pixel values stored as a single bit value (e.g., 0 or 1). As an example, the conversion module 60 may initially determine a relative luminance value (L) of each pixel of the averaged image using the below luminance relation.

$$L=xR+yG+zB \qquad (1)$$

In the above luminance relation, "R" refers to an 8-bit value corresponding to an amount of red light, "G" refers to an 8-bit value corresponding to an amount of green light, and "B" refers to an 8-bit value corresponding to an amount of blue light. Furthermore, "x" refers to a predetermined red light coefficient, "y" refers to a predetermined green light coefficient, and "z" refers to a predetermined blue light coefficient. In some forms, each of the coefficients is a value between 0 and 1. In some forms, the blue light coefficient is less than the red light coefficient, and the red light coefficient is less than the green light coefficient (i.e., $z<x<y$). Accordingly, the conversion module 60 may convert the pixel to a binary value of "1" when the relative luminance value (L) is greater than a threshold value, and the conversion module 60 may convert the pixel to a binary value of "0" when the relative luminance value (L) is less than or equal to a threshold value. It should be understood that the conversion module 60 may perform other types of color image to binary-type image conversions and is not limited to the examples described herein.

In one form, modifying the averaged image includes converting the averaged image to a grayscale-type image, which may be an image having pixel values stored as an 8-bit value between 0-255. As an example, the conversion module 60 may average or weigh the amount of red light (R), blue light (B), and green light (G) of each pixel to generate the grayscale-type image. It should be understood that the conversion module 60 may perform other types of color image to grayscale-type image conversions and is not limited to the examples described herein.

In one form, the scaling module 70 is configured to selectively perform a scaling routine on a template image corresponding to the interior of the vehicle 10. In one form, the template image corresponds to a nominal image of the interior of the vehicle 10 when no defects are present within the interior of the vehicle 10, and a template image may be stored in the template image database 80 for each type of vehicle 10. As an example, the scaling module 70 is configured to determine whether an image scale of the template image is equal to an image scale of the source image. If the image scales are unequal, the scaling module 70 may iteratively adjust the image scale of the template image, determine a correlation coefficient value for each iteration, and determine a value of the image scale based on the correlation coefficient value. Specifically, the scaling routine may be iteratively performed until the value of the image scales are equal. If the image scales are equal, the scaling module 70 may provide the template image to the conformity module 90. As such, the scaling module 70 is configured to inhibit scale invariances from affecting the accuracy of a template matching routine performed by the conformity module 90, as described below in further detail.

In one form, the conformity module 90 is configured to generate a conformity value based on a comparison between the source image and the template image. In one form, the conformity module 90 is configured to perform a template matching routine based on the source and template images, and the conformity value may be a cross-correlation value of the matching routine, a normalized cross-correlation value of the matching routine, and/or a sum-of-squared difference value of the matching routine. To perform the template matching routine, the conformity module 90 is configured to perform a sliding dot product routine based on the template and the source images (e.g., sliding the template image over the source image).

As an example, the conformity module 90 may perform a normalized cross-correlation routine (as the template matching routine) that outputs, for each pixel of the source image, a normalized cross-correlation value that is invariant to brightness changes. The normalized cross-correlation value may be between −1 and 1, where values proximate or equal to −1 indicate that the template and source images are different, and where values proximate or equal 1 indicate the template and source images are identical. As another example, the conformity module 90 may perform a cross-correlation routine (as the template matching routine) that outputs, for each pixel of the source image, a cross-correlation value that is indicative of the similarity between the template and source images (e.g., higher cross-correlation values indicate a higher degree of similarity between the template and source images). As an additional example, the conformity module 90 may perform a sum-of-squared difference (SSD) routine that outputs, for each pixel of the source image, an SSD value that is based on a squared difference between corresponding pixels of the source and template images (e.g., lower SSD values indicate a higher degree of similarity between the template and source images). In one form, the conformity value is a matrix having a size that corresponds to the number of pixels in the template/source images, and where each element of the matrix includes the normalized cross-correlation value, cross-correlation value, or SSD value of a given pixel.

In one form, the defect module 110 is configured to determine a presence of a defect based on the conformity value. In one form, the defect module 110 is configured to compare the conformity value to a reference conformity value stored in the reference conformity value database 100 to determine the presence of a defect. In one form, the reference conformity value database 100 stores reference conformity values for each type of vehicle 10. As an example, the defect module 110 compares the matrix (as the conformity value) to a reference matrix (as the reference conformity value) and determines that a defect is present if one or more elements of the matrix deviates from the corresponding one or more elements of the reference matrix beyond a threshold amount.

In one form, the defect module 110 is configured to determine a defect type based on a segmentation-based image processing routine (e.g., semantic segmentation and/or instance segmentation routines), the comparison of the conformity value and the reference conformity value, or a combination thereof. In one form, the segmentation-based image processing routine includes identifying one or more components of the source image and comparing the one or more identified components to one or more predefined reference components of the template image to determine the defect type.

In one form, the predefined reference components of the image are defined during various known deep learning routines and/or supervised/semi-supervised machine learning routines. As an example, the predefined reference components are defined during a random forest training routine that defines various components of the interior of the vehicle 10, such as a dashboard, a trim, a central console, seats, seatbelts, among other interior vehicle components. Additionally, an expected pixel coordinate of the predefined reference components are defined while performing the deep learning routines and/or supervised/semi-supervised machine learning routines.

As an example, the defect module 110 performs the segmentation-based image processing routine to identify various components of the source image (e.g., driver and passenger seats of the vehicle 10). The defect module 110 may determine that the defect type is a component defect when the defect module 110 determines a presence of the defect and the pixel coordinates of the identified components correspond to the given expected pixel coordinates. Additionally, the defect module 110 may further define the component defect based on the deviation between the reference value and the conformity value, such as, but not limited to: surface cracks, inclusions, and/or other undesirable coloring/aesthetic characteristics.

As another example, the defect module 110 may determine that the defect type is an installation defect when the defect module 110 determines a presence of the defect and the pixel coordinates of the identified components do not correspond to the given expected pixel coordinates. Additionally, the defect module 110 may further define the installation defect based on the deviation between the reference value and the conformity value, such as, but not limited to: an incorrect component being installed within the vehicle 10 or an incorrect installation location of the component within the vehicle 10.

In one form, the manufacturing routine module 120 is configured to determine, for each of the vehicles 10, 45-1, 45-2, a step of the manufacturing routine and whether a transition between steps of the manufacturing routine has occurred (e.g., a first step of the manufacturing routine is completed, and a second step of the manufacturing routine is initiated). If a transition between steps occurs, the manufacturing routine module 120 instructs the imaging system 20 to obtain an image and thereby initiate the functions of the controller 40 described herein. As such, the manufacturing routine module 120 enables the controller 40 readily identify the presence and/or type of defect of the vehicle 10 at each step of the manufacturing routine as opposed to once the vehicle 10 is built.

Figure 4:
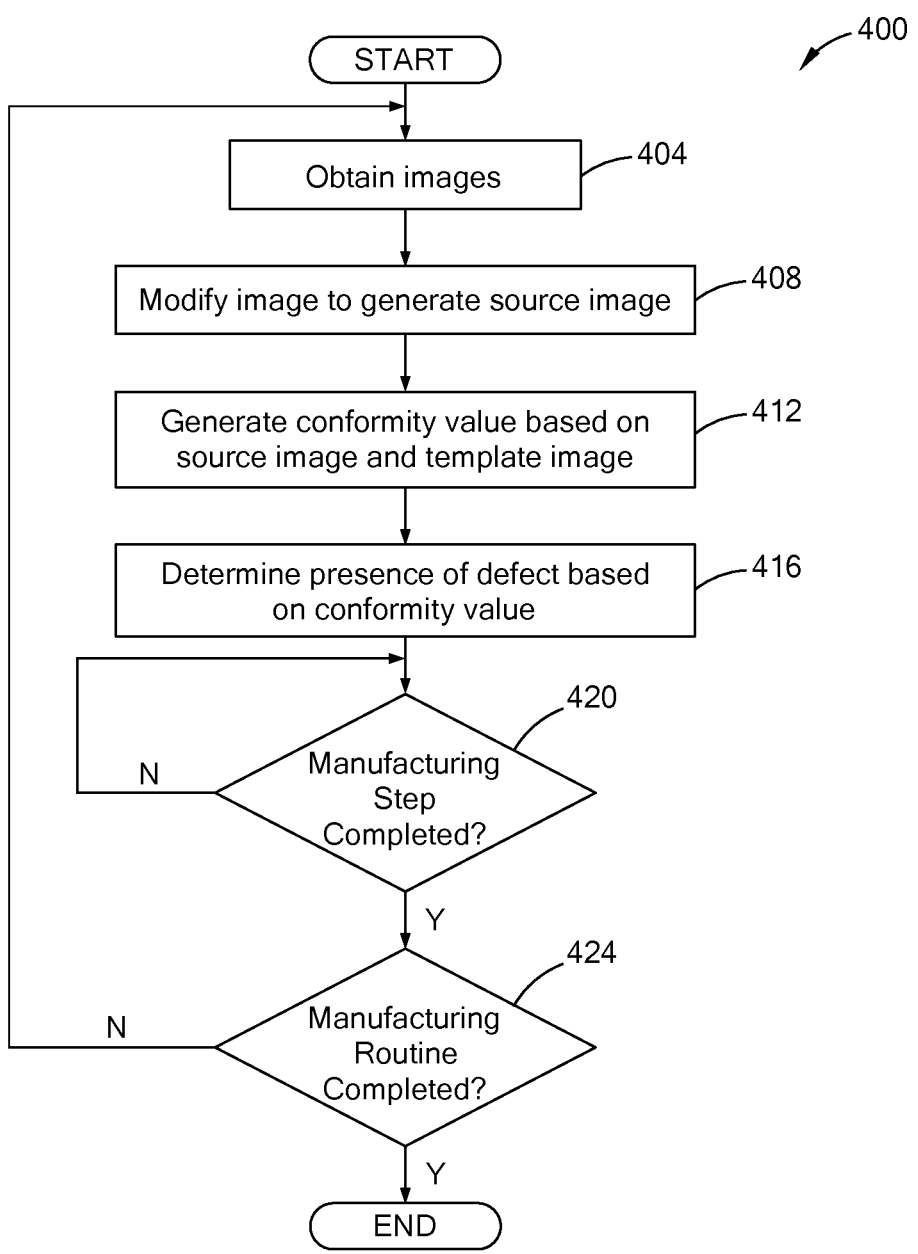
FIG. 4 illustrates an example routine for inspecting an interior or exterior of a vehicle in accordance with the teachings of the present disclosure.

Referring to FIG. 4, an example routine 400 for inspecting the vehicle 10 is shown. At 404, the imaging system 20 obtains images of the vehicle 10 or the adjacent vehicles 45-1, 45-2. At 408, the controller 40 modifies the images obtained by the imaging system 20 to generate the source image (e.g., the normalization module 50 performs the normalization routine and/or the conversion module 60 performs the conversion routine). At 412, the controller 40 generates the conformity value based on the comparison between the source image and the template image, and the defect module 110 determines the presence of the defect based on a comparison between the conformity value and the reference conformity value at 416.

At 420, the controller 40 determines whether the given step of the manufacturing routine is completed. If so, the routine 400 proceeds to 424. Otherwise, if the given step is not completed, the routine 400 remains at 420 until the given step is completed. At 424, the controller 40 determines whether the manufacturing routine is completed (i.e., the vehicle 10 or portion thereof is built and no additional steps will be performed). If the routine is incomplete, the routine 400 proceeds to 404. Otherwise, if the manufacturing routine is completed, the routine 400 ends.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for inspecting an interior of a vehicle, the method comprising:

performing a manufacturing routine to build a vehicle, wherein the manufacturing routine comprises a plurality of steps;

at each step of the plurality of steps, performing an inspection routine on an interior of the vehicle, wherein the inspection routine comprises:

obtaining image data from one or more imaging devices disposed in the interior of the vehicle, wherein the image data includes one or more images corresponding to the interior of the vehicle and a vehicle identification number;

generating, from averaging each pixel value of a first image of the image data with each pixel value of a second image of the image data, an averaged image;

modifying the averaged image based on a color conversion routine to generate a source image;

generating a conformity value based on a comparison between the source image and a template image corresponding to the interior of the vehicle, wherein the conformity value is a cross-correlation value, a normalized cross-correlation value, a sum-of-squared difference value, or a combination thereof;

determining a presence of a defect based on the conformity value;

identifying a component of the interior of the vehicle and pixel coordinates of the component based on a segmentation-based image processing routine; and determining a type of the defect as an installation defect when the pixel coordinates of the component do not correspond to expected pixel coordinates of the component; and remediating the installation defect in response to detecting the installation defect at one or more steps of the plurality of steps.

2. The method of claim 1, wherein modifying the image based on the color conversion routine to generate the source image further comprises converting the source image to one of a binary-type image and a grayscale-type image.

3. The method of claim 1 further comprising adjusting an image scale of the template image in response to a size of the source image being unequal to a size of the template image.

4. The method of claim 3, wherein adjusting the image scale of the template image further comprises:

iteratively adjusting the image scale of the template image;

determining a correlation coefficient value for each iteration; and determining a value of the image scale based on the correlation coefficient value of each iteration.

5. The method of claim 1, wherein modifying the averaged image further comprises:

converting the averaged image to a binary-type image.

6. The method of claim 1, wherein determining the presence of the defect further comprises comparing the conformity value to a reference conformity value.

7. A system for inspecting an interior of a vehicle, the system comprising:

a processor; and a non-transitory computer-readable medium comprising instructions that are executable by the processor, wherein the instructions comprise:

performing a manufacturing routine to build a vehicle, wherein the manufacturing routine comprises a plurality of steps;

at each step of the plurality of steps, performing an inspection routine on an interior of the vehicle, wherein the inspection routine comprises:

obtaining image data from one or more imaging devices disposed in the interior of the vehicle, wherein the image data includes one or more images and a vehicle identification number;

generating, from averaging each pixel value of a first image of the image data with each pixel value of a second image of the image data, an averaged image;

modifying the averaged image based on a color conversion routine to generate a source image, wherein the source image is one of a binary-type image and a grayscale-type image;

generating a conformity value based on a comparison between the source image and a template image corresponding to the interior of the vehicle, wherein the conformity value is a cross-correlation value, a normalized cross-correlation value, a sum-of-squared difference value, or a combination thereof;

determining a presence of a defect based on the conformity value;

identifying a component of the interior of the vehicle and pixel coordinates of the component based on a segmentation-based image processing routine; and determining a type of the defect as an installation defect when the pixel coordinates of the component do not correspond to expected pixel coordinates of the component; and remediating the installation defect in response to detecting the installation defect at one or more steps of the plurality of steps.

8. The system of claim 7, wherein the instructions further comprise adjusting an image scale of the template image in response to a size of the source image being unequal to a size of the template image.

9. The system of claim 8, wherein the instructions for adjusting the image scale of the template image further comprise:

iteratively adjusting the image scale of the template image;

determining a correlation coefficient value for each iteration; and determining a value of the image scale based on the correlation coefficient value of each iteration.

10. The system of claim 7, wherein the instructions for determining the presence of the defect further comprise comparing the conformity value to a reference conformity value.

11. A method for inspecting an interior of a vehicle, the method comprising:

performing a manufacturing routine to build a vehicle, wherein the manufacturing routine comprises a plurality of steps;

at each step of the plurality of steps, performing an inspection routine on an interior of the vehicle, wherein the inspection routine comprises:

obtaining image data from one or more imaging devices disposed in the interior of the vehicle, wherein the image data includes one or more images and a vehicle identification number;

generating, from averaging each pixel value of a first image of the image data with each pixel value of a second image of the image data, an averaged image;

modifying the averaged image based on a color conversion routine to generate a source image, wherein the source image is one of a binary-type image and a grayscale-type image;

generating a conformity value based on a comparison between the source image and a template image corresponding to the interior of the vehicle, wherein the conformity value is a cross-correlation value, a normalized cross-correlation value, a sum-of-squared difference value, or a combination thereof;

determining a presence of a defect based on the conformity value;

identifying a component of the interior of the vehicle and pixel coordinates of the component based on a segmentation-based image processing routine; and determining a type of the defect as an installation defect when the pixel coordinates of the component do not correspond to expected pixel coordinates of the component; and remediating the installation defect in response to detecting the installation defect at one or more steps of the plurality of steps.

12. The method of claim 11 further comprising adjusting an image scale of the template image in response to a size of the source image being unequal to a size of the template image.

13. The method of claim 12, wherein adjusting the image scale of the template image further comprises:

iteratively adjusting the image scale of the template image;

determining a correlation coefficient value for each iteration; and determining a value of the image scale based on the correlation coefficient value of each iteration.

14. The method of claim 11, determining the presence of the defect further comprises comparing the conformity value to a reference conformity value.

* * * * *